Oct. 23, 1956 F. G. BURG 2,767,598
SPEED CONTROL SYSTEM FOR MACHINE TOOLS
Filed March 15, 1952 8 Sheets-Sheet 1
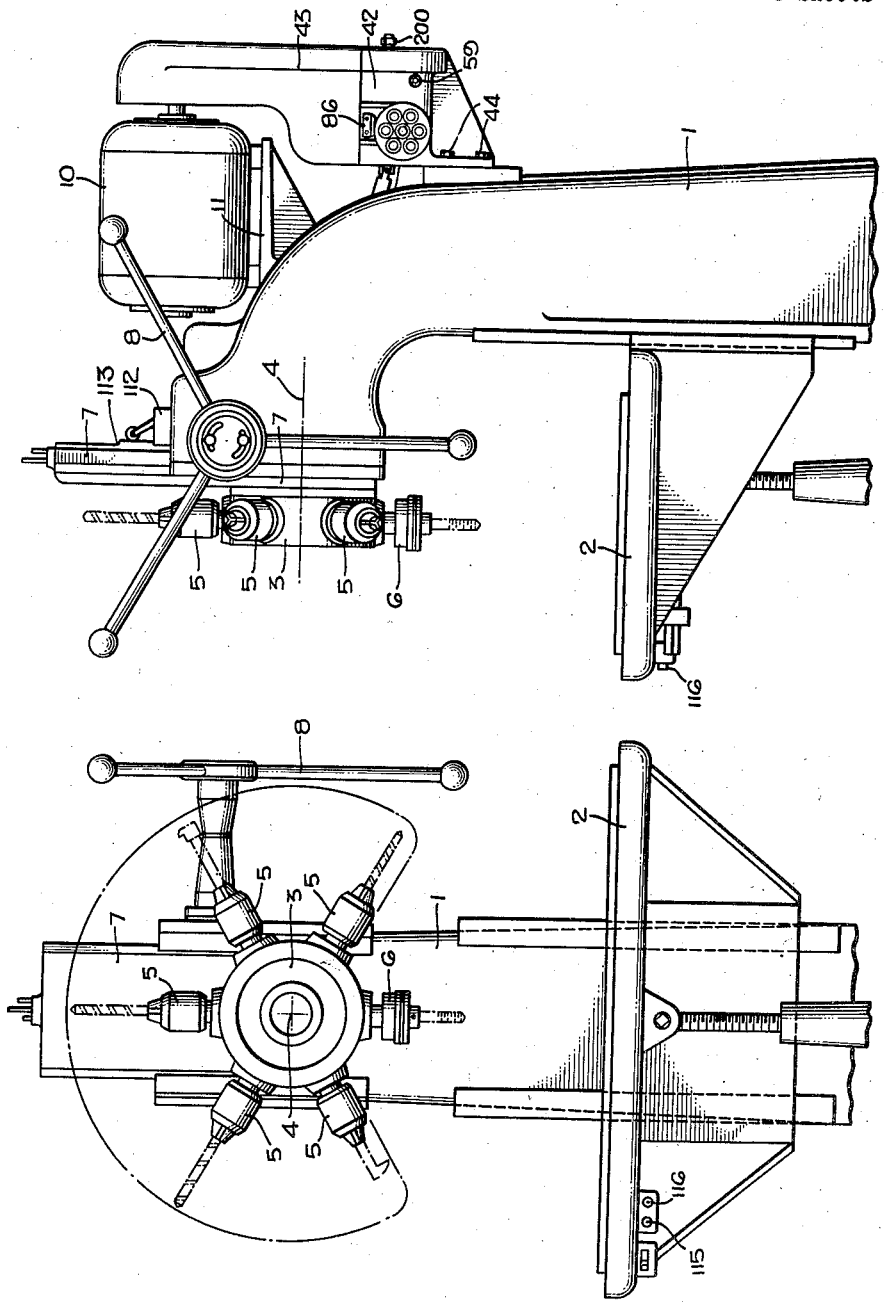
FRED G. BURG,
INVENTOR.
BY John Flam
ATTORNEY

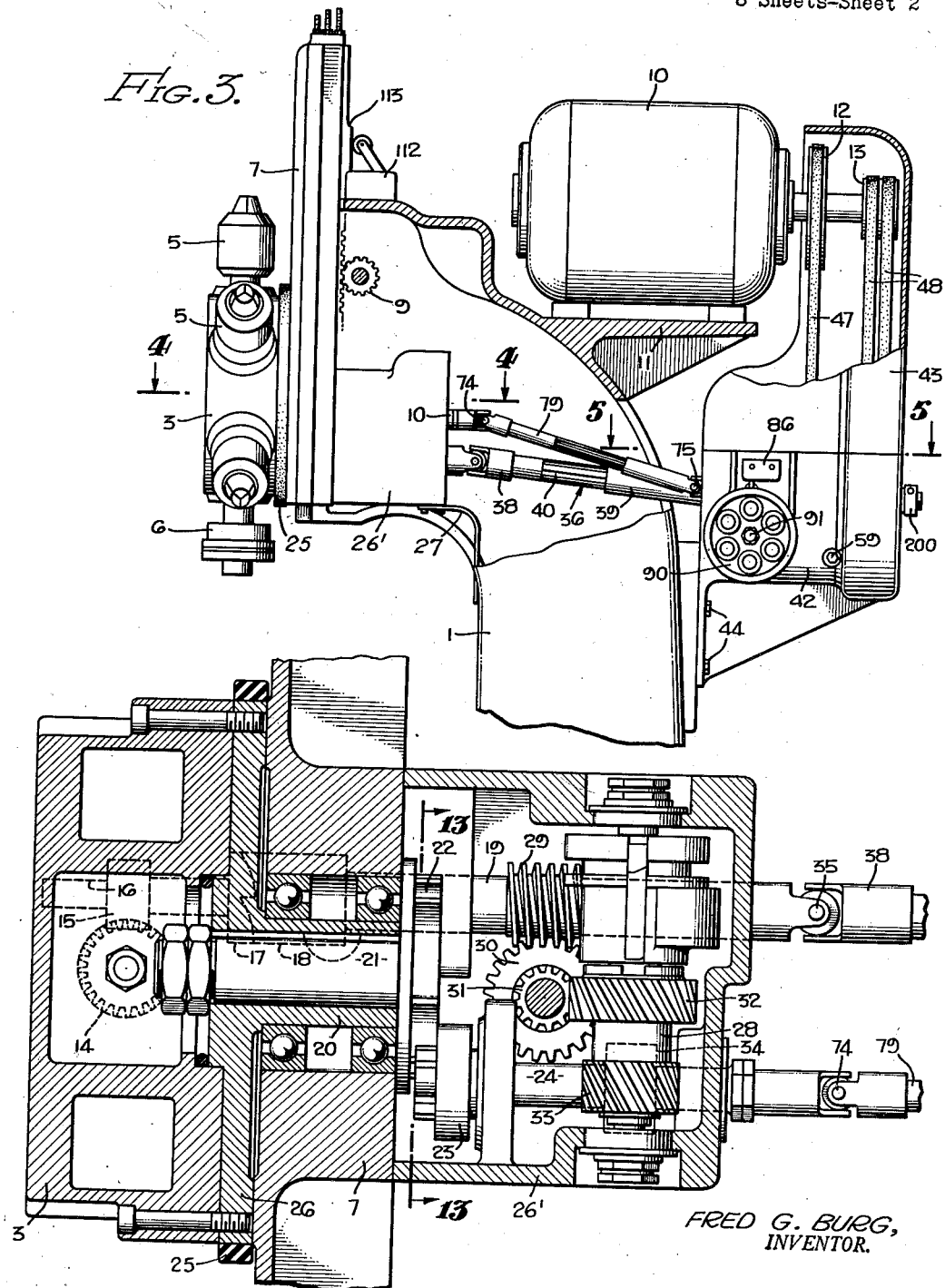

Oct. 23, 1956 F. G. BURG 2,767,598
SPEED CONTROL SYSTEM FOR MACHINE TOOLS
Filed March 15, 1952 8 Sheets-Sheet 3

FRED G. BURG,
INVENTOR.

BY
ATTORNEY

Oct. 23, 1956

F. G. BURG 2,767,598

SPEED CONTROL SYSTEM FOR MACHINE TOOLS

Filed March 15, 1952

FRED G. BURG,
INVENTOR.

BY John Flann
ATTORNEY.

Oct. 23, 1956   F. G. BURG   2,767,598
SPEED CONTROL SYSTEM FOR MACHINE TOOLS
Filed March 15, 1952   8 Sheets-Sheet 5
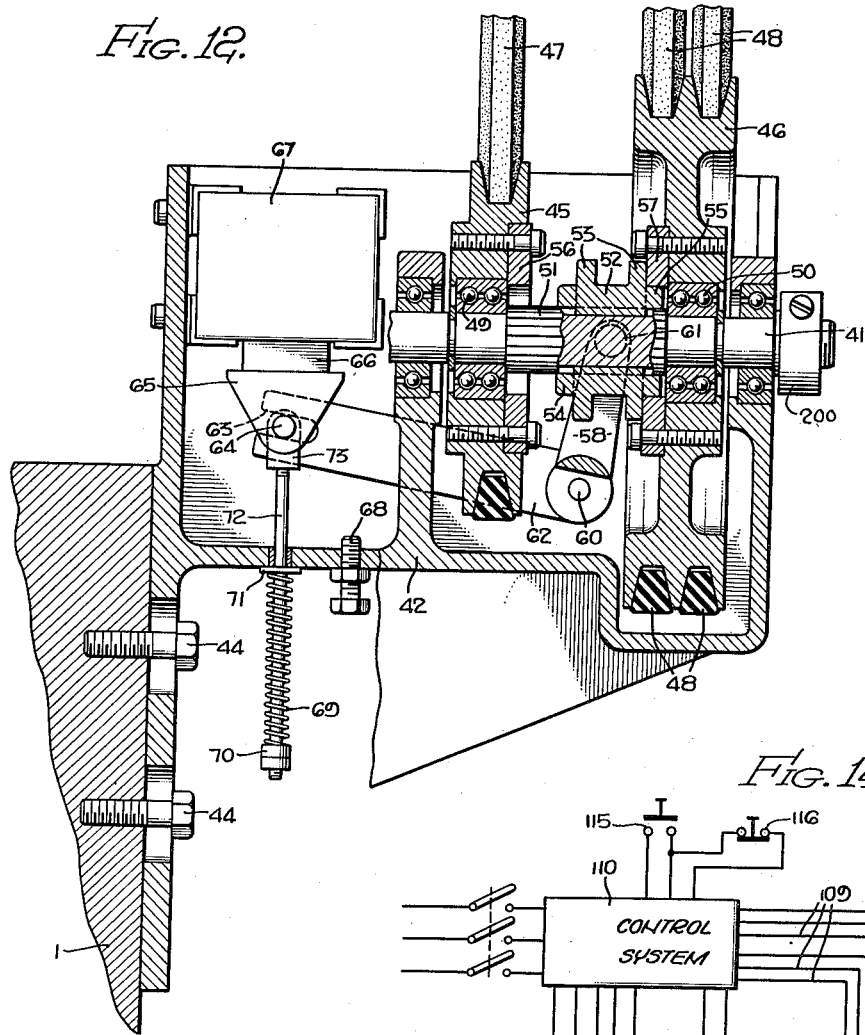
FRED G. BURG,
INVENTOR.
BY John Flann
ATTORNEY

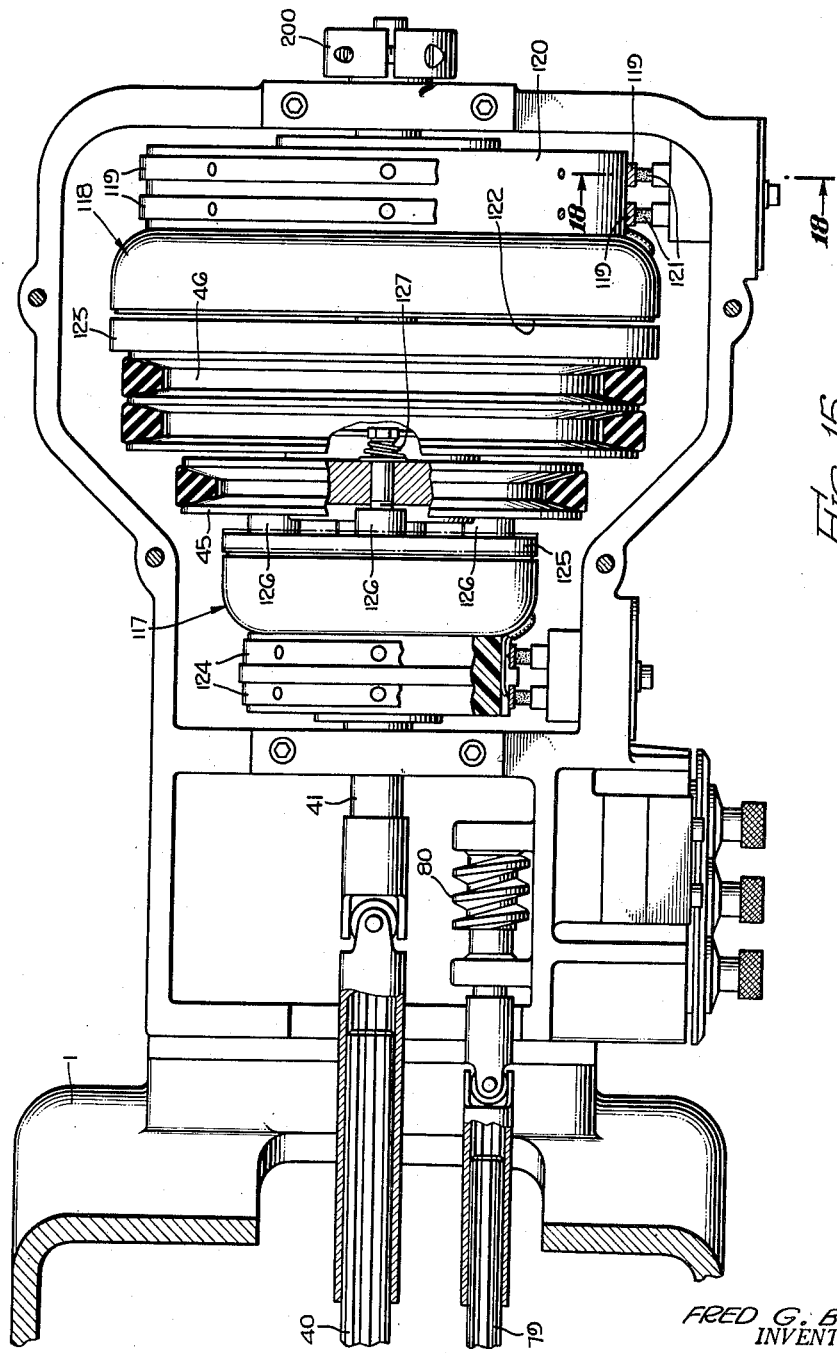

Oct. 23, 1956   F. G. BURG   2,767,598
SPEED CONTROL SYSTEM FOR MACHINE TOOLS
Filed March 15, 1952   8 Sheets-Sheet 7

FRED G. BURG,
INVENTOR.

BY John Flann
ATTORNEY

Oct. 23, 1956   F. G. BURG   2,767,598
SPEED CONTROL SYSTEM FOR MACHINE TOOLS
Filed March 15, 1952   8 Sheets-Sheet 8

FRED G. BURG,
INVENTOR.

BY John Flam
ATTORNEY

United States Patent Office 2,767,598
Patented Oct. 23, 1956

2,767,598
SPEED CONTROL SYSTEM FOR MACHINE TOOLS

Fred G. Burg, Los Angeles, Calif.

Application March 15, 1952, Serial No. 276,755

13 Claims. (Cl. 74—665)

This invention relates to machine tools using rotary tool elements, such as drill presses, or the like, and particularly to the control of the speed of rotation of the rotary tool elements.

This application is a continuation-in-part of an application filed on June 10, 1948, under Serial Number 32,198, and entitled, Machine Tool of the Drill Press Type Having Multiple Rotary Tools; now Patent No. 2,670,636, issued on March 2, 1954.

In that prior application, there is described a drill press having a tool head angularly adjustable about an axis. A slidable support or carrier for the head makes it possible to move the head toward and from the work. The head carries radially extending tool holders equiangularly spaced around the axis. One only of the tool holders is rotated. When the carriage or support is moved sufficiently away from the work, the head is angularly adjusted to a new position, and a different tool holder is effective. Thus, one tool holder may carry a drill, the next in order a tap or a reamer, and succeeding tool holders may carry any type of rotary tool.

The means for rotating the tool holder includes an appropriate source of power, such as a three-phase induction motor that has a substantially constant speed characteristic over a wide range of load. However, for the most effective operation, the speed of rotation of the individual tools should be fixed at an optimum value. For example, a tapping operation is usually performed at a different speed from a drilling or reaming operation. Furthermore, a large diameter drill should be rotated at a lower speed than a drill of small diameter.

It is one of the objects of this invention to make it possible automatically to select the speed of the tool when the head brings the tool to operative position, and particularly by the aid of simple apparatus.

The present arrangement is such that any one of the tools can be driven at any one of four speeds; and the speed can be selected in a convenient and simple manner. To effect this result, the power transmission from the motor to the tool includes a choice of two ratios, such as two pulley drives that may optionally be selected; also, the speed of the motor itself can be adjusted from high to low, as by rearranging the winding sections, for example, from delta to γ, from one member of poles to half the number. Thus, for minimum speed, the motor is connected for low speed operation, and a clutch is moved to cause the low speed pulley to be effective. For the next higher speed, the motor is left connected as before, but the clutch is moved to cause the high speed pulley to be effective. For the next higher speed, the motor is connected for high speed operation, and the low speed pulley is effective. For maximum speed, the motor is operated at high speed, and the clutch is operated to render the high speed pulley effective.

It is thus another object of this invention to provide a simple control system of this character that preselects the speeds of rotation to be imparted to the tool holders as they arrive in operative position.

It is still another object of this invention to provide a speed preselector that may be manually preset without the necessity of stopping the machine or of making adjustments on the head structure itself.

This invention possesses many other advantages, and has other objects which may be made more clearly apparent from a consideration of several embodiments of the invention. For this purpose, there are shown several forms in the drawings accompanying and forming part of the present specification. These forms will now be described in detail, illustrating the general principles of the invention; but it is to be understood that this detailed description is not to be taken in a limiting sense, since the scope of this invention is best defined by the appended claims.

Referring to the drawings:

Figure 1 is a fragmentary front view of a vertical drill press in which the invention is incorporated;

Fig. 2 is a fragmentary side elevation thereof;

Fig. 3 is an enlarged fragmentary view, partly in section, of the upper portion of the drill press shown in Figs. 1 and 2;

Fig. 4 is an enlarged sectional view, taken along a plane corresponding to line 4—4 of Fig. 3;

Fig. 12 is a sectional view taken along a plane corresponding to line 12—12 of Fig. 5;

Fig. 13 is a sectional view, taken along a plane corresponding to line 13—13 of Fig. 4;

Fig. 14 is a schematic wiring diagram of the speed control system;

Fig. 15 is a view, similar to Fig. 4, of a modified form of the invention;

Figure 5:
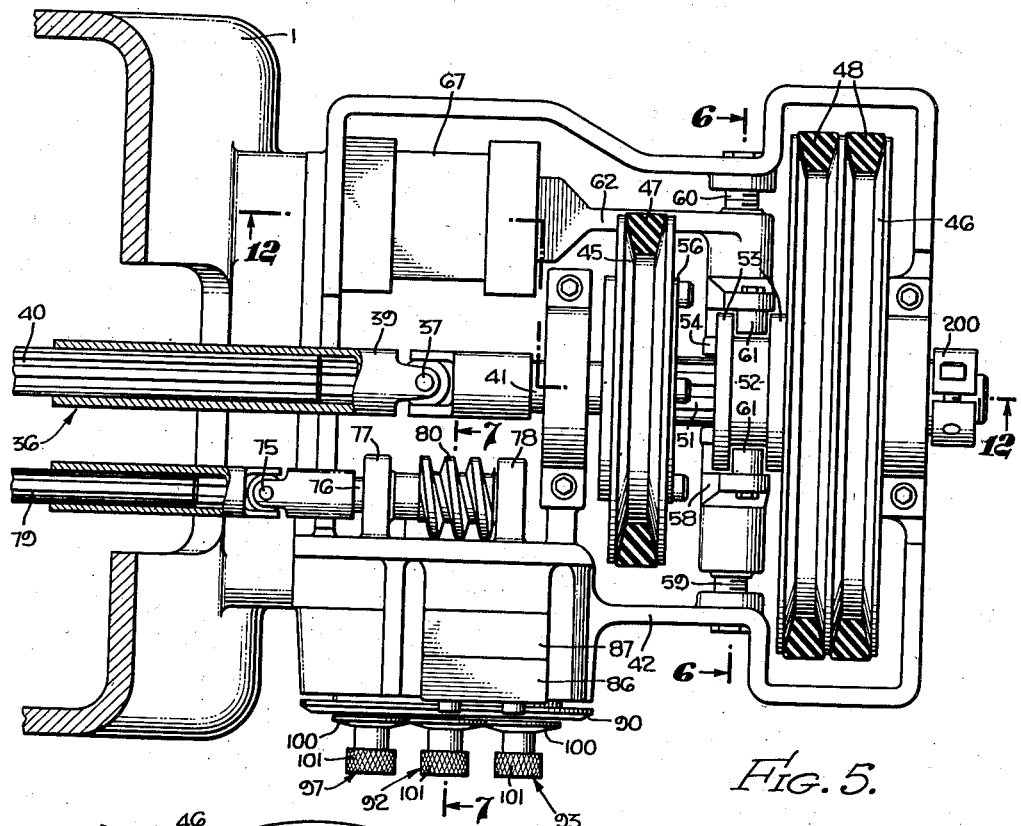
Fig. 5 is a sectional view, taken along a plane corresponding to line 5—5 of Fig. 3.

In Figs. 1, 2, and 3, there is shown a hollow drill press standard or frame 1. A vertically adjustable work table 2 of any desired form is disposed immediately beneath a tool head structure 3. This head structure 3 is arranged for angular adjustment about a horizontal axis 4. As described in the hereinabove identified application, this head structure 3 is provided with a plurality of tool holders or chucks 5 and 6, disposed radially of axis 4 and adapted to hold rotary tool devices, such as drills, taps, reamers, or the like, shown in phantom lines in Figs. 1 and 2.

The head structure 3 may be mounted upon a carriage structure 7, by the aid of which it may be moved downwardly or upwardly toward and from the work table 2. This vertical movement of the head structure 3 is effected by the aid of the spoked wheel 8 and a rack and pinion mechanism 9, indicated diagrammatically in Fig. 3. Further details of this mechanism are considered unnecessary to view of the disclosure of this type of mechanism in said hereinabove identified application. It is sufficient to note that the carriage 7, with its associated head 3 and other mechanism to be hereinafter described, can be caused to move vertically by appropriate operation of the wheel 8. Appropriate counterweights or balances may be utilized to render it unnecessary to employ any material lifting force when moving the head structure 3 and the carriage 7 upwardly.

Each of the tool holder devices 5, 6, etc., is arranged to be sequentially driven by a transmission mechanism driven by an electric motor 10. This electric motor 10 is mounted on a bracket 11 (Figs. 2 and 3) extending from the upper portion of the frame 1. In the present instance, this electric motor 10 is indicated as a three-phase induction motor having a shaft provided with a large pulley 12 and a multiple belt pulley 13 of smaller diameter. By appropriate mechanism to be hereinafter described, either pulley 12 or 13 is optionally rendered operative to rotate the tool holders 5, 6, etc., at individually preset speeds.

In order to rotate that tool holder, such as 6, which is directed vertically downwardly, a helical gear 14 (Fig. 4) is coupled to the tool holder 6. This gear, in turn, is driven by the aid of a helical gear 15 mounted on a shaft 16. This shaft is supported in head 3, and carries one coupling member 17 engaged by a retractable driving coupling member 18. This driving coupling member 18 is mounted on a shaft 19 connected to the output end of the transmission from the motor 10 to the shaft 19.

In the said prior application, there is described a mechanism whereby the head, such as 3, may be rotated so as to position the tool holders 5, 6, etc., sequentially in proper operative position with respect to the table 2, and operating automatically upon sufficient retraction.

The base plate 26 of head structure 3 is accordingly provided with a hub extension 20 (Fig. 4) keyed to a shaft 21 rotatably supported in the vertically movable carriage 7. The shaft 21 carries a Geneva wheel 22 (see Fig. 13), adapted to be advanced through an angle by a cooperating Geneva mechanism 23 mounted appropriately upon a shaft 24.

If desired, a ring 25, made of resilient material, such as neoprene, can be disposed to overlie the base member 26 of the head structure 3 for preventing the entry of dust or dirt into the head member proper.

The transmission shaft 19 and the Geneva movement shaft 24 are appropriately journaled in a casing 26' which is attached to the vertically movable carriage 7. A member 27 (Fig. 3) is attached to the lower edge of the casing 26 to provide a dust cover for the opening in the upper portion of the standard 1.

Angular movement of the head 3 about axis 4, sequentially to position the tools in operative relation to the table 2, is effected by the the aid of a one-revolution clutch mechanism, indicated generally by reference character 28 (Fig. 4). This mechanism is arranged similarly to that shown in the said prior application, and the specific structure is described and claimed in a copending application, Ser. No. 276,755, filed March 15, 1952, entitled Speed Control System for Machine Tools, in the name of Fred G. Burg.

This one-revolution mechanism 28 is driven by the aid of a worm 29 mounted on the transmission shaft 19. This worm meshes with a worm wheel 30 coupled to a helical gear 31, in turn rotating a helical gear 32 mounted on the clutch mechanism 28, and serving to drive that mechanism through one revolution when the head 3 is raised sufficiently. This one-way clutch mechanism also includes a helical gear member 33 cooperating with a helical gear 34 mounted on the Geneva shaft 24.

When the carriage 7 is moved a sufficient distance away from the work table 2, a trip mechanism is actuated to permit the clutch mechanism 28 to rotate through one revolution. This rotation causes, first of all, unlocking of the head structure 3 and movement of the coupling member 18 to uncoupling position. Then the Geneva shaft 24 is actuated, by gears 33 and 34, to move the head structure 3 through an angle of sixty degrees. Thereupon, the next sequential tool device 5 or 6 is positioned in operative position with respect to the table 2. The head structure 3 is then locked in its new angular position, and coupling member 18 is moved to the left to the operating tool device. This continues until the carriage 7 is again moved upwardly away from the work, whereupon there is effected a succeeding operation of adjusting the angular position of the head and of uncoupling and coupling the transmission shaft 19.

Shaft 19, as indicated most clearly in Figs. 3, 4, and 5, is connected as by joint 35, to the universal link 36. This universal link 36 is joined, as by universal joint 37, to the end of a shaft 41 (see, also, Fig. 12). The link 36 is provided with the end heads 38 and 39 connected by a spline member 40 which is splined to each of the members 38 and 39. Accordingly, vertical movement of the carriage 7 is permitted without disturbing the drive from the transmission output shaft 41.

Shaft 41 is rotatably mounted in the lower casing half 42. The upper casing half 43 (Fig. 2) is extended to cover the pulleys 12 and 13. The lower member 42 is appropriately mounted upon the standard 1, as by the aid of the machine screws 44 (Figs. 3 and 12).

A collar 200 (see, also, Fig. 5) is fastened to the right-hand end of shaft 41, and exteriorly of casing 42—43, to limit axial movement of the shaft.

Mounted upon the shaft 41 are the two pulleys 45 and 46. Pulley 45 is of relatively small diameter, and is coupled, as by a V-belt 47, to the larger pulley 12 of the motor 10. The larger pulley 46 is a multiple groove pulley, and is driven by the aid of the V-belts 48 by the motor pulley 13.

Both of the pulleys 45 and 46 are mounted for free rotation, as by the aid of the ball bearing structures 49 and 50, upon shaft 41. The motor 10 rotates both of these pulleys continuously, when energized, by aid of the motor pulleys 12 and 13. A clutch structure, now to be described, serves to couple either one or the other of the pulleys 45 or 46 to the shaft 41. When pulley 45 is coupled to the shaft 41, the output shaft 19 is rotated at a relatively fast rate; and, correspondingly, when the pulley 46 is coupled to the shaft 41, the output shaft 19 is rotated at a relatively slow rate.

The shaft 41 is provided with a splined portion 51 extending between the bearing structures 49 and 50 (Fig. 12). Splined to this portion is a slidable clutch member 52 having a pair of spaced flanges 53. Clutch member 52, at each of its opposite ends, has a pair of projections 54 or 55. The clutching projections at each end of the member 52 are diametrically opposite each other. They are intended to engage in corresponding slots formed in the clutch plates 56 and 57, attached respectively to the pulleys 45 and 46.

In the position of Figs. 5 and 12, the right-hand clutch projections 55 are active and, accordingly, the shaft 41 is driven by the larger pulley 46. The clutch projections 54 are free of engagement with the slots in the clutch plate 56 and, accordingly, the pulley 45 is free to rotate with respect to shaft 41. Now, if the clutch member 52 is moved toward the left, as viewed in Fig. 12, the projections 55 disengage from the clutch plate 57 and will engage the clutch member 56. In this position, the shaft 41 is driven at a higher rate.

Figure 6:
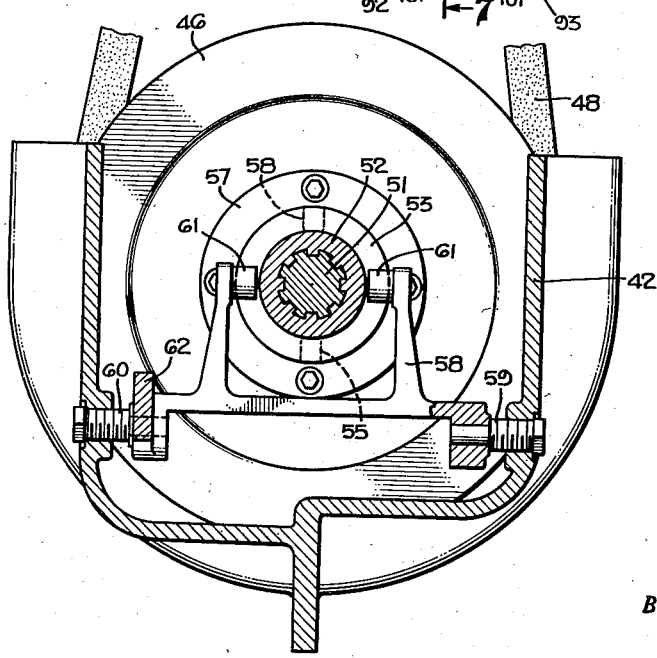
Fig. 6 is a sectional view, taken along a plane corresponding to line 6—6 of Fig. 5.

Movement of the clutch member between these two positions is effected electromagnetically in any appropriate manner. For example, a shift yoke structure 58 is mounted on the pivot screws 59 and 60 threaded within the opposite walls of the casing half 42. This shift yoke is provided with inwardly directed pins 61 (Fig. 6) engaging between the flanges 53 of clutch member 52. Connected to the left-hand end of the shift yoke 58 is a lever arm 62. This lever arm 62 is provided with a slotted end 63 engaged by a pin 64 carried by a clevis member 65. This member 65 is mounted on a core 66 of an electromagnet 67 (Fig. 12). When the electromagnet is energized, as indicated in Fig. 12, the pulley 46 is coupled to shaft 41. When it is deenergized, the lever 62 contacts an appropriate stop pin 68 mounted on the lower casing 42. A compression spring 69 (Fig. 12), mounted on stem 72, is arranged to oppose the pull of the electromagnet 67 so as to move the clutch member 52 toward the left when the electromagnet is deenergized. Accordingly, this compression spring 69 abuts a collar 70 at the lower end of stem 72, coupled to member 65 as by aid of a clevis 73 engaging pin 64. At its upper end, spring 69 abuts a washer 71 disposed around stem 72.

Energization and deenergization of this clutch mechanism is effected, as required, by a speed control mechanism. Not only is the electromagnet 67 thus controlled, but, in addition, the windings of the motor 10 are also controlled to make it possible to operate the motor 10 at either a low speed or a high speed. In this way, there are four definite speeds that may be obtained, the maximum speed corresponding to the high speed of the motor and to the coupling of the smaller pulley 45 to the shaft 41. The minimum speed corresponds to the low speed operation of the motor 10 and to the position of the clutch member 52 in which the shaft 41 is driven through the large pulley 46.

Two intermediate speeds are obtained, corresponding to low speed operation of the motor 10 in combination with the coupling of high speed pulley 45 to shaft 41, and a different intermediate speed in which the motor 10 is operated at high speed, and the low speed pulley 46 is in driving relation to the shaft 41.

As heretofore stated, the head structure 3 is rotated through a definite angle by the aid of the Geneva movement mechanism 22—23 (Fig. 13). The shaft 24 (driven by clutch mechanism 28) as shown most clearly in Figs. 4 and 5, is coupled, as by the aid of the universal joints 74 and 75, to a shaft 76 appropriately rotatably supported in the bearings 77 and 78 mounted upon a wall of the lower casing 42. By the aid of the telescoping spline member 79, this drive is rendered effective irrespective of the vertical position of the housing 26' as it moves in accordance with the vertical movement of the head structure 3 and carriage 7.

A worm 80 (see, also, Fig. 7) is mounted on the shaft 76 for rotating a worm wheel 81. This worm wheel 81 is appropriately attached, as by key 82, to a shaft 83 which is rotatable in a bearing bushing 84. This bushing 84 is mounted in a boss 85 formed on the wall of casing 42.

There is thus imparted to shaft 83 a sequential angular movement corresponding to the angular movement of the head structure 3. This shaft carries appropriate speed preselecting cam structures which are brought, in succession, into operative relation with microswitch structures 86 and 87 that are mounted on a wall of casing 42. There are as many speed control cam mechanisms as there are tool holders carried by the head 3.

The shaft 83 has a flange 88 contacting bushing 84, as well as a reduced portion 89. Held on the reduced portion 89 is a rotatable support or frame 90. This support or frame 90 is clamped against the collar or flange 88 by the aid of a crown nut 91 (see, also, Fig. 8). Accordingly, the frame 90 is rotated sequentially and simultaneously with the angular movement of the head structure 3 about its axis 4.

Arranged in a planetary fashion and equiangularly about the axis of shaft 89, and supported by the frame 90, are the speed control cam devices 92, 93, 94, 95, 96, and 97. These speed control devices are moved in succession into cooperative relative with the microswitches 86 and 87. Each of these microswitches has a cam follower 98 attached in a well known manner to a movable arm 201 operating a switch.

Figure 10:
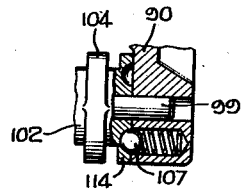
Fig. 10 is a fragmentary sectional view, taken along a plane corresponding to line 10—10 of Fig. 9.
Figure 7:
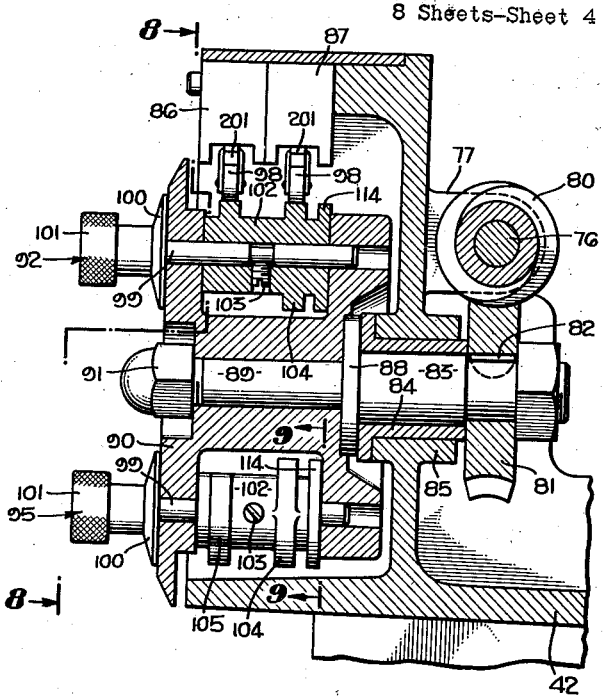
Fig. 7 is an enlarged front sectional view, taken along a plane corresponding to line 7—7 of Fig. 5.

The cam devices are arranged for individual angular adjustment about their shafts 99 so as to adjust the angular positions of the cam elements. These shafts, as shown most clearly in Figs. 7 and 10, are appropriately journaled in opposite walls of the frame 90. The left-hand end of each of the shafts carries a dial member 100 and a manually manipulable knob 101. Attached to each of the shafts 99 is a cam structure 102. These cam structures may be attached to the respective shafts, as by the aid of a headless set screw 103 (see, also, Fig. 11) which engages a reduced portion of the corresponding shaft 99. The axial length of the cam structure 102 corresponds with the space between the bearings of the corresponding shaft 99, whereby axial movement of the shafts 99 is restrained.

Figure 8:
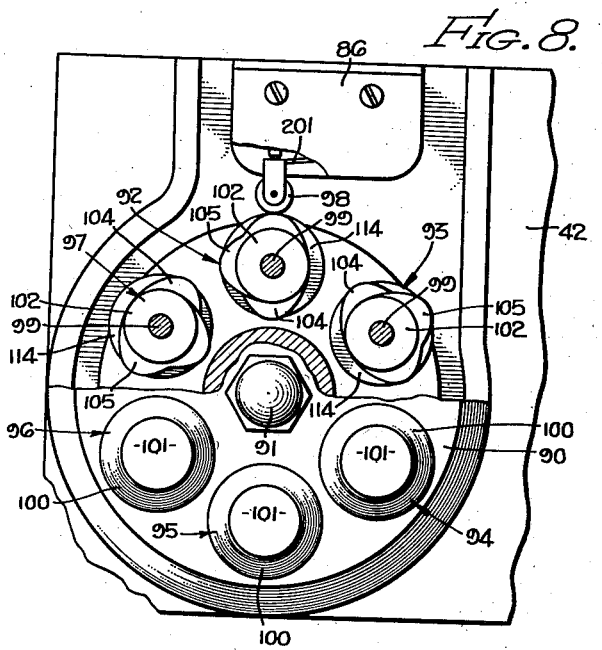
Fig. 8 is a view, partly in section, taken along a plane corresponding to line 8—8 of Fig. 7.
Figure 11:
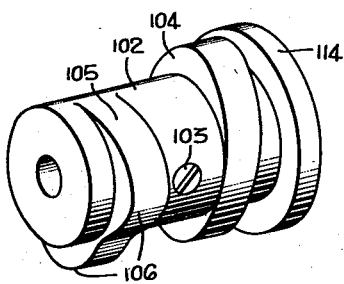
Fig. 11 is a pictorial view of one of the speed controlling cams utilized in connection with the preselector.

Since all the cam structures are identical, the description of one of them suffices for all. Reference may now be had to Figs. 7, 8, and 11. Each cam structure includes a flange 114 abutting a wall of the frame 90. Adjacent the flange 114 is a cam member 104 having diametrically opposite high portions. Axially spaced from the cam member 104 is another cam member 105. This cam member 105 has two high portions 106 displaced ninety degrees from each other.

Figure 9:
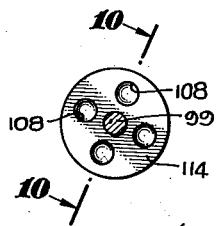
Fig. 9 is a fragmentary sectional view, taken along a plane corresponding to line 9—9 of Fig. 7.

Adjustment of the cam structure 102 about the axis of the respective shaft 99 is manually accomplished by the aid of the appropriate corresponding knob 103. It is held in adjusted position by the aid of a spring-pressed ball 107 engaging any one of four spherical recesses 108 (Fig. 9) located in the flange 114. The dials 100 indicate the positions of the cam structures.

Maximum speed of the transmission shaft 41 may be referred to as position 1 on the dial 100. As shown in Fig. 14, microswitch 87 in this position is open, and the electromagnet 67 is deenergized. Accordingly, the clutch member 52 is moved toward the left, the smaller pulley 45 being then coupled to the shaft 41. Similarly, cam 104 permits the microswitch 87 to attain the position indicated in Fig. 14. This corresponds to high speed connection of the motor 10. The six leads 109, extending to the control system 110, provide the appropriate connections for low speed operation of the stator winding by positioning the microswitch 87 as indicated in this diagram.

The speed, however, may be adjusted by angular adjustment of the cam structure 102. Thus, assuming that the cam structure 102 is moved through ninety degrees from the position shown in Fig. 14, in a counterclockwise direction, the microswitch cam 105 is still inactive, and the high speed pulley 45 remains clutched to shaft 41. However, the arm 67 of microswitch 87 is moved upwardly by cam 104 and, accordingly, the motor 10 is operated at low speed. This corresponds to one of two intermediate speeds.

A further rotation of ninety degrees in a counterclockwise direction brings one of the projections 106 of cam member 105 to active position, energizing electromagnet 67. However, the switch 87 is allowed to close the contact 111, corresponding to high speed operation of the motor 10. This corresponds to another intermediate speed, the motor speed 10 now being high and the larger or low speed pulley 46 being coupled to the shaft 46.

Another ninety degree adjustment of the cam structure 102 maintains the motor speed in the low position, and the electromagnet 67 is energized, causing coupling of the larger pulley 46 to the shaft 41. This corresponds to the minimum speed.

The positions of the cams indicated in Fig. 8 are typical of the several possible adjustments.

As indicated in Fig. 14, another switch 112 is provided which independently causes the motor 10 to assume a low speed. This microswitch is operated for this purpose by a cam surface 113 carried by the carriage 7 as it approaches its upward limit of movement. Accordingly, for this purpose, the angular adjustment of the head structure 3 and the movement of the speed control member 90 is effected at a relatively low rate.

By appropriate preselection of the angular positions of the cam structures 102 about their respective shafts 99, any one of the four speeds can be effective when the cam structures arrive at the active position. This active position corresponds to the position of the mechanism 92 in Fig. 8.

Start and stop buttons 115 and 116 serve to initiate and terminate the periods of operation of motor 10.

In the form of the invention just described, a shiftable clutch device 52 is positionable into cooperative position with either of the pulley wheels 45 or 46.

In the form shown in Figs. 15 to 20, independently operable electromagnetic clutches are provided for the low speed pulley and the high speed pulley respectively. Thus, as shown most clearly in Figs. 15 and 20, there are mounted upon, and in driving relation with, the output shaft 41 of the transmission mechanism the electromagnetically operated clutch mechanisms 117 and 118.

Clutch mechanism 118 is provided with a pair of collector rings 119 (Figs. 15 and 18), mounted on an insulation member 120, for conducting current to an operating electromagnetic coil. These collector rings are contacted by the stationary brushes 121 to which appropriate electrical connections may be made for completing an energizing circuit to the clutch mechanism 118. The clutch mechanism 118 has a core provided with a core surface 122 opposite an axially movable armature 123. This axially movable armature is coupled, as by the aid of pins arranged annularly around the shaft axis, to the low speed pulley 46, and a spring structure is used for urging the armature 123 toward the left, as shown in Fig. 15, in which the pulley 46 is out of coupling relation with the shaft 41. When, however, the electromagnetic clutch structure 118 is energized, the armature 123 is shifted to the right, by electromagnetic force, into driving relation with the clutch structure, and coupling is thereby effected to the pulley 46.

The clutch structure 117 is of similar construction, and cooperates with the high speed pulley 45. Thus, a pair of collector rings 124 is provided, by the aid of which a connection may be made to the electromagnet embodied in structure 117. In the position shown in Fig. 15, the armature 125 is in attracted position and, accordingly, the pulley 45 is coupled to shaft 41. The armature 125 is coupled to the pulley 45 by the aid of a plurality of annularly spaced pins 126, similarly to that described for clutch structure 118. Springs 127 respectively cooperate with the pins 126 to urge them toward the right. Accordingly, when the electromagnetically operated clutch 117 is deenergized, the armature 125 assumes the phantom line position, and pulley 45 is uncoupled from shaft 41.

Figure 16:
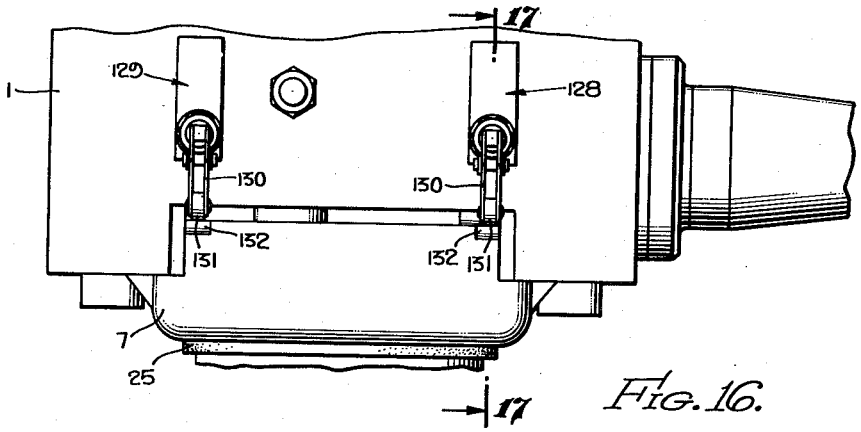
Fig. 16 is a fragmentary plan view of a portion of a machine in which the modified form of the invention is included.
Figure 17:
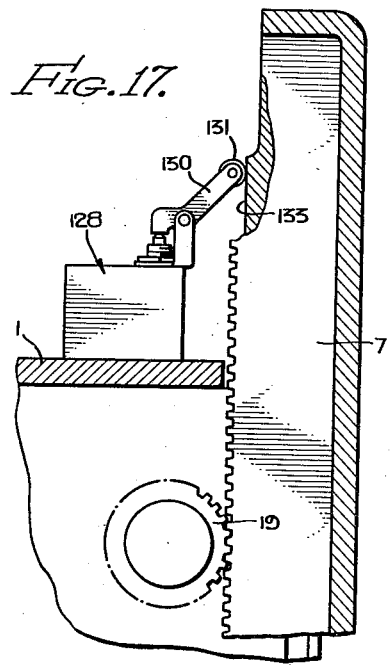
Fig. 17 is a fragmentary sectional view, taken along a plane corresponding to line 17—17 of Fig. 16.
Figure 18:
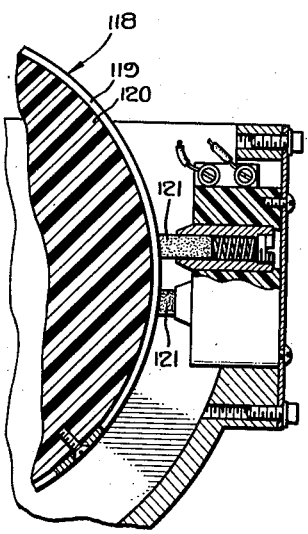
Fig. 18 is a fragmentary sectional view, taken along a plane corresponding to line 18—18 of Fig. 15.

As indicated in Figs. 16 and 17, the frame 1 supports a pair of microswitch structures 128 and 129. Each of these microswitch structures 128 has an operating lever 130 upon which a cam roller 131 is mounted. The carriage 7 has a pair of cam surfaces 132 adapted to cooperate with the rollers 131. Thus, when the carriage 7 is moved upwardly, away from the work, the levers 130 are moved in a counterclockwise direction by the surfaces 133 of the carriage 7. When the carriage 7 is moved downwardly, the spring pressure incorporated in the microswitch mechanisms 128 and 129 urges the levers 130 in a clockwise direction for operating the contact mechanisms within these switches.

Figure 19:
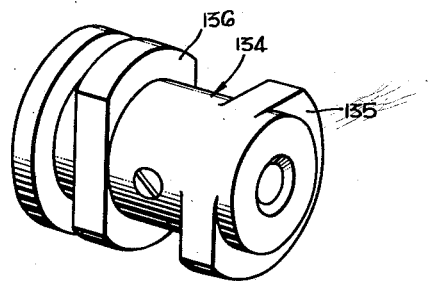
Fig. 19 is a view similar to Fig. 11, illustrating a modified form of cam structure.
Figure 20:
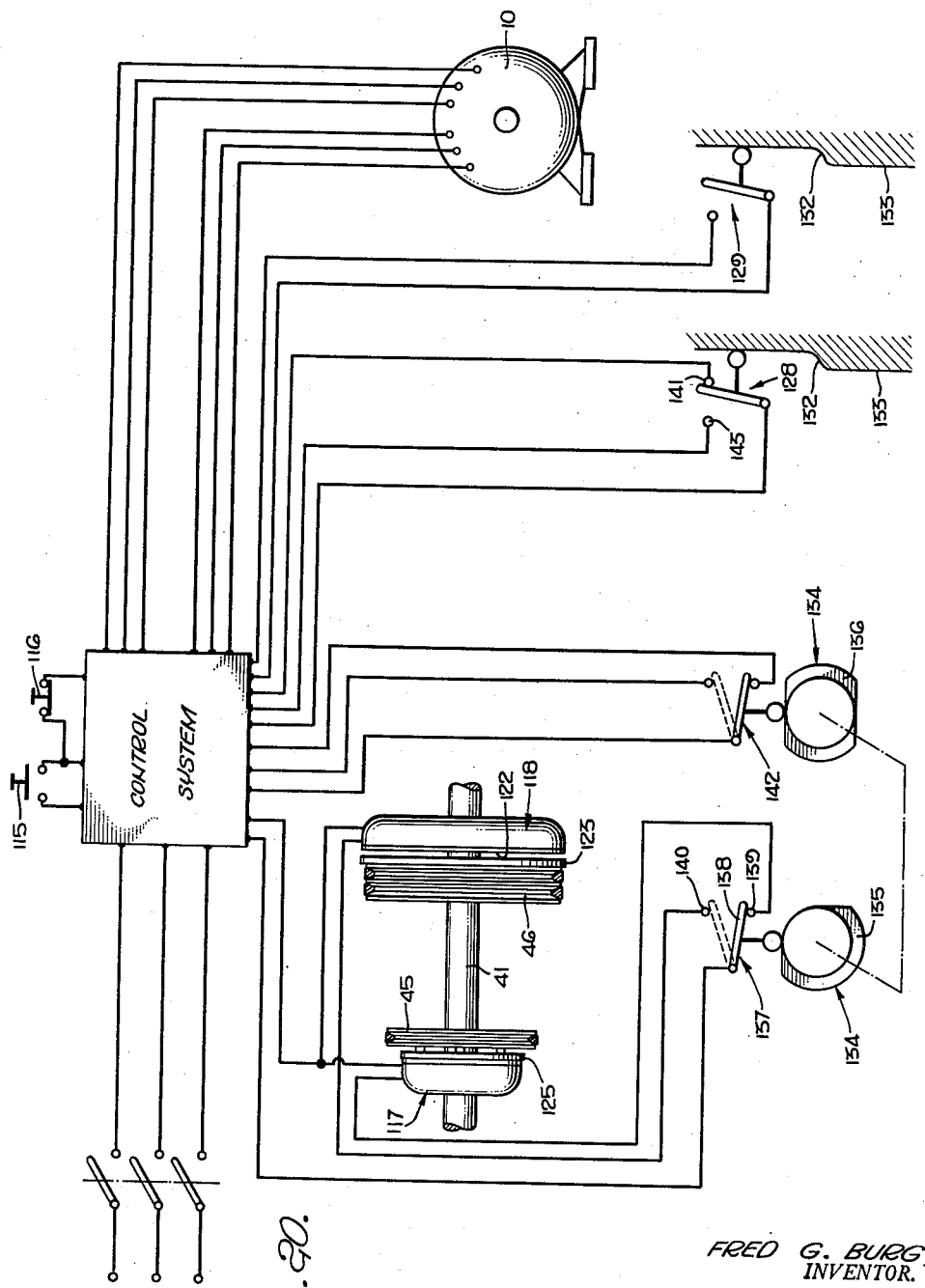
Fig. 20 is a schematic wiring diagram of the speed control system shown in Figs. 15 to 19.

The wiring diagram, Fig. 20, illustrates the complete control system utilizing the rotary cam structure 134 shown in Fig. 19. This rotary cam structure is similar to that shown in Fig. 11, except that the cam devices 135 and 136 are formed as segments of a circle.

In the position shown in Fig. 20, the high speed pulley 45 is clutched to the shaft 41, and the low speed pulley 46 is unclutched. This is effected by the aid of the microswitch 137, which has an arm 138 capable of making a connection with a lower contact 139 or an upper contact 140. For the position shown, cam 135 is inactive, and arm 138 connects to lower contact 139.

The circuit for the clutch mechanism 117 is completed through the arm 138 and contact 139 to the clutch mechanism 117.

Similarly, the motor control cam 136 is in inactive position, and microswitch 142 is in the lower position corresponding to high speed connection for the motor 10. Accordingly, for this position, the transmission mechanism drives the output shaft 41 at maximum speed.

For a counterclockwise rotation of the cam structure 134 through an angle of ninety degrees, the motor control microswitch 142 is operated by the cam 136 to provide low speed motor operation. However, this ninety degree counterclockwise angular motion does not affect the microswitch 137. Accordingly, an intermediate speed is effected, corresponding to low speed motor operation with the high speed pulley structure.

A succeeding movement of the cam structure through an angle of ninety degrees now causes cam 135 to move the microswitch 137 upwardly so that its arm 138 connects with the contact 140, causing clutch 118 to be energized. At the same time, the circuit for the clutch mechanism 117 is broken. In this position, the cam 136 returns the microswitch 142 to high speed operation for the motor 10.

The microswitch 137 now connects the clutch mechanism 118 and the low speed pulley 46 is active. Accordingly, this corresponds to the third speed, corresponding to high motor speed, in conjunction with low speed pulley 46.

A further angular movement of ninety degrees maintains the pulley 46 in active position, and the microswitch 142 is operated to effect a low speed connection for the motor 10. This corresponds to a movement of 270° in the counterclockwise direction from that illustrated in Fig. 20, and results in the minimum speed.

When the carriage 7 is moved far enough upwardly away from the work, the transmission is returned to an intermediate speed by the microswitches 128 and 129. Microswitch 128 is operated by the cam surface 132 to energize the circuit for the clutch mechanism 117 and to deenergize the circuit for the clutch mechanism 118. This is accomplished by the aid of the stationary contacts 141 and 143. Contact 143 completes the circuit for the clutch mechanism 117 independently of the microswitch 137.

The microswitch 129 is caused to close when the carriage 7 approaches the limits of its upward movement, ensuring that the motor speed 10 will be low to provide an intermediate rate of motion to perform the adjusting operations of head 3.

The inventor claims:

1. In a system for preselecting the output speed of a transmission: a series of preselector mechanisms angularly spaced from each other about an axis; a plurality of rotary devices sequentially connectible to said transmission; means coupling said devices to the mechanisms to move said mechanisms sequentially through an angle about said axis; and speed determining means cooperating with that mechanism which is at a definite angular position.

2. In a system for preselecting the output speed of a transmission: a variable ratio transmission mechanism; a plurality of angularly adjustable cam mechanisms; the axes of said cam mechanisms being parallel and spaced from each other; means for sequentially moving said mechanisms so that they arrive in succession at a definite position; and a circuit for effecting adjustment of the ratio of transmission, including a circuit controller at said position and operated by that cam mechanism which is at said position.

3. In a system for preselecting the output speed of a transmission: a plurality of angularly adjustable cam mechanisms; the axes of said cam mechanisms being parallel and spaced from each other; a plurality of rotary devices sequentially connectible to said transmission; means coupling said devices to the mechanisms to move said mechanisms sequentially to a definite position; and a circuit controller at said position and operated by that cam mechanism which is at said position.

4. In a system for preselecting the output speed of a transmission: a plurality of angularly adjustable cam mechanisms; the axes of said cam mechanisms being parallel and spaced from each other; a support for said mechanisms and mounted on an axis parallel to the axes of the cam mechanisms, for angular adjustment of the support; a plurality of rotary devices; a head upon which the devices are mounted and angularly movable to position the devices in sequential order to cooperate with the transmission, there being as many cam mechanisms as rotary devices; means for simultaneously positioning the head and the support to move one of the cam mechanisms and a corresponding device to operative positions; and a circuit controller cooperating with said one of said mechanisms.

5. In a system for preselecting the output speed of a transmission: a variable ratio transmission mechanism; a plurality of angularly adjustable cam mechanisms; a support for said mechanisms and mounted on an axis for angular adjustment; said cam mechanisms being angularly spaced about said axis; a plurality of rotary devices; a head upon which the devices are mounted and angularly movable to position the devices in sequential order to cooperate with the transmission, there being as many cam mechanisms as rotary devices; means for simultaneously positioning the head and the support to move one of the cam mechanisms and a corresponding device to operative positions through an angle about the support axis; an electrically operated clutch means cooperating with the transmission and having two positions corresponding to two different speed ratios; and a circuit controller cooperating with said one of said mechanisms for affecting the operation of said clutch means.

6. In a system for preselecting the output speed of a transmission: a variable transmission; a series of spaced preselector mechanisms, each of said mechanisms having cam means angularly adjustable about an axis, the axis of each cam means being separate from the axis of the other cam means; a common means for simultaneously advancing said mechanisms so that any one of the mechanisms is brought to a definite position; and means cooperating with that mechanism which is at said position, for determining said speed.

7. In a system for preselecting the output speed of a transmission: a variable transmission; a series of preselector mechanisms; a rotary support upon which the mechanisms are mounted, said mechanisms being angularly spaced about the axis of the support; each of said mechanisms having cam means angularly adjustable about a second axis; means for angularly moving the support about the axis of the support to bring the mechanisms sequentially to a definite angular position; and means cooperating with that mechanism which is at said position, for determining said speed.

8. In a system for preselecting the output speed of a transmission: a series of spaced preselector mechanisms, each of said mechanisms having cam means angularly adjustable about an axis, the axis of each cam means being separate from the other cam means; a plurality of rotary devices; means for sequentially bringing said devices into operative relation to the transmission, and simultaneously for sequentially moving said mechanisms to a definite position; and means cooperating with that mechanism which is at said position, for determining said speed.

9. In a system for preselecting the output speed of a transmission: a variable transmission; a series of preselector mechanisms; a rotary support upon which the mechanisms are mounted, said mechanisms being angularly spaced about the axis of the support; each of said mechanisms having cam means angularly adjustable about a second axis; a plurality of rotary devices; means for bringing said devices sequentially into operative relation to the transmission, and simultaneously for angularly moving the support about the axis of the support to bring the mechanisms sequentially to a definite angular position; and means cooperating with that mechanism which is at said position, for determining said speed.

10. In a system for preselecting the output speed of a transmission: a variable transmission; a plurality of angularly adjustable cam mechanisms; a support for said mechanisms and mounted on an axis for angular adjustment; said cam mechanisms having separate axes and angularly spaced about said support axis; means for angularly moving the support about the axis of the support to bring one of the cam mechanisms to a definite angular position; an electrically operated clutch cooperating with the transmission and having two positions corresponding to two different speed ratios; and a circuit controller cooperating with said one of said mechanisms for affecting the operation of the clutch.

11. In a system for preselecting the output speed of a transmission having an input shaft; a plurality of angularly adjustable cam mechanisms; a movable support for said mechanisms; the axes of said mechanisms being parallel and spaced along said support; means for moving the support in a step-by-step manner to bring the cam mechanisms sequentially to a definite position; an electrically operated clutch cooperating with the transmission and having two positions corresponding to two different speed ratios; electrical means for altering the speed of the input shaft; circuits for the clutch and said electrical means; and circuit controllers cooperating with the cam mechanism at the definite position for affecting the operation of the clutch and of said electrical means.

12. In a system for preselecting the output speed of a transmission mechanism having a shaft; a low speed wheel and a high speed wheel mounted on said shaft and optionally coupled to said shaft; electrical means for altering the speed of said shaft; electrically energizable means for selecting one or the other of said wheels for coupling to the shaft; circuits for said electrical means and electrically energizable means; a plurality of adjustable preselector mechanisms; circuit controllers for said circuits operable by said mechanism; and means sequentially moving said mechanisms to a definite operating position.

13. In a system for preselecting the output speed of a transmission having an input shaft: a plurality of angularly adjustable cam mechanisms; a movable support for said mechanisms; the axes of said mechanisms being parallel and spaced along said support; a plurality of rotary devices; a head upon which the devices are mounted and angularly movable to position the devices in sequential order to cooperate with the transmission, there being as many cam mechanisms as rotary devices; means for simultaneously positioning the head and the support to move one of the cam mechanisms and a corresponding device to operative positions; an electrically operated clutch cooperating with the transmission and having two positions corresponding to two different speed ratios; electrical means for altering the speed of the input shaft; circuits for the clutch and said electrical means; circuit controllers cooperating with that cam mechanism which is in operative position, for affecting the operation of the clutch and of said electrical means.

(References on following page)

References Cited in the file of this patent

UNITED STATES PATENTS

| | | |
|---|---|---|
| 863,966 | Billeter | Aug. 20, 1907 |
| 1,103,180 | Elliott | July 14, 1914 |
| 1,345,497 | Kempin | July 6, 1920 |
| 2,303,243 | Trythall | Nov. 24, 1942 |
| 2,352,183 | Bullard | June 27, 1944 |
| 2,366,573 | Swallow | Jan. 2, 1945 |
| 2,414,126 | Sevin | Jan. 14, 1947 |
| 2,427,493 | Bullard | Sept. 16, 1947 |
| 2,581,804 | Marx | Jan. 8, 1952 |
| 2,647,411 | Filocamo | Aug. 4, 1953 |

FOREIGN PATENTS

| | | |
|---|---|---|
| 304,880 | Great Britain | Jan. 31, 1929 |